US007123903B2

(12) United States Patent
Seki

(10) Patent No.: US 7,123,903 B2
(45) Date of Patent: Oct. 17, 2006

(54) WIRELESS TELEPHONE AND WIRELESS TELEPHONE SYSTEM

(75) Inventor: Shuichi Seki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 432 days.

(21) Appl. No.: 10/344,899

(22) PCT Filed: Jul. 13, 2001

(86) PCT No.: PCT/JP01/06099

§ 371 (c)(1),
(2), (4) Date: Feb. 26, 2003

(87) PCT Pub. No.: WO03/009632

PCT Pub. Date: Jan. 30, 2003

(65) Prior Publication Data

US 2004/0102163 A1    May 27, 2004

(51) Int. Cl.
*H04M 3/42* (2006.01)
(52) U.S. Cl. .................... 455/414.1; 455/401; 455/567
(58) Field of Classification Search ............. 455/412.1, 455/412.2, 414.1, 417, 425, 550.1, 401, 567; 379/67.1, 70, 88.11, 88.23, 377, 386
See application file for complete search history.

(56) References Cited

U.S. PATENT DOCUMENTS 5,758,280 A * 5/1998 Kimura ................... 455/412.2
6,018,671 A * 1/2000 Bremer ........................ 455/567
6,154,644 A * 11/2000 Murray ..................... 455/414.1
6,236,853 B1 * 5/2001 Mee et al. ................ 455/414.1
6,741,678 B1 * 5/2004 Cannell et al. ........... 379/88.14
6,751,212 B1 * 6/2004 Kaji et al. ................... 370/352
2001/0051517 A1 * 12/2001 Strietzel ..................... 455/414

FOREIGN PATENT DOCUMENTS

| JP | 2-67829 | 3/1990 |
| JP | 4-59648 | 5/1992 |
| JP | 8-191480 | 7/1996 |
| JP | 10-313485 | 11/1998 |
| JP | 11-252651 | 9/1999 |
| JP | 2000-49928 | 2/2000 |
| JP | 2000-286932 | 10/2000 |
| KR | P2000-0000244 | * 1/2000 |

* cited by examiner

*Primary Examiner*—Barry Taylor
(74) *Attorney, Agent, or Firm*—Oblon, Spivak, McClelland, Maier & Neustadt, P.C.

(57) ABSTRACT

In a related art mobile telephone system, the generation of an RBT (ring back tone) and a busy tone is realized by transmitting data registered in a network system to a calling telephone. In a mobile telephone system according to this invention, RBT data and the like are previously registered in a called telephone, and when a calling telephone originates a call to this called telephone, data corresponding to an operating state of the called telephone is transmitted to the calling telephone. Accordingly, an RBT and the like can be easily changed with a user's original melody or the like, whereby it is possible to improve service for the user.

21 Claims, 14 Drawing Sheets

WIRELESS TELEPHONE AND WIRELESS TELEPHONE SYSTEM

TECHNICAL FIELD

This invention relates to a wireless telephone and a wireless telephone system for use in a mobile telephone system such as W-CDMA (Wideband—Code Division Multiple Access) and cdma2000.

BACKGROUND OF THE INVENTION

According to a related art, the case where a call is made from a mobile telephone which is one kind of wireless telephone to another mobile telephone or a fixed telephone and the like, the calling mobile telephone generates a tone corresponding to the operating state of the called telephone. For example, in the case where the calling mobile telephone is calling the called telephone, the calling mobile telephone generates a ring back tone. In the case where the called telephone is busy, the calling mobile telephone generates a busy tone. In addition, in the case where the called telephone is a mobile telephone and exists out of a service area, the calling mobile telephone generates a voice such as "the telephone you calls is turned off or is in a place radio waves do not reach".

This operating state of the called telephone is generated in the calling mobile telephone by transmitting tone data generally registered in a network system such as an automobile switching center to the calling mobile telephone (refer to, for example, Japanese Patent Laid-Open No. Hei 10-313485).

More specifically, in the case where the called telephone receives an incoming call from the calling mobile telephone, the called telephone transmits call setting accepted data corresponding to its operating state at that time to the network system. The network system, when it receives this call setting accepted data, reads tone data corresponding to the operating state of the called telephone from the registered data on the basis of the call setting accepted data, and transmits the tone data to the calling mobile telephone. The calling mobile telephone generates a tone corresponding to this received tone data.

In this manner, the tone data corresponding to the operating state of the called telephone (operating state informing data) is registered in the network system, so that only a system operator can generate and change the tone data. This leads to the problem that a user cannot be informed of the operating state of the called telephone in the user's original representation form.

SUMMARY OF THE INVENTION

An object of this invention is, therefore, to provide a wireless telephone and a wireless telephone system both of which can inform a user of a calling telephone of the operating state of a called telephone in the user's original representation form.

This invention to achieve the above-described object has a construction for, after a predetermined call originating manipulation, receiving operating state informing data indicative of an operating state of a called telephone from the called telephone, which data is registered in the called telephone, and informing the operating state of the called telephone on the basis of this received operating state informing data.

The operating state informing data is, for example, ring back tone data indicative of a calling state, busy tone data indicative of a busy state or intercept tone data indicative of a data-reception-impossible state, and the operating state informing means generates the ring back tone, the busy tone or the intercept tone.

In the case where the invention to achieve the above-described object is viewed from another point of view, this invention has a construction in which operating state informing data indicative of operating states are previously registered, and in a case where a wireless telephone receives call setting request data from a calling telephone, the wireless telephone wirelessly transmits to the calling telephone, operating state informing data corresponding to an operating state of the wireless telephone when the wireless telephone receives the call setting request data from among the registered operating state informing data.

According to the above-described constructions, by transmitting the operating state informing data registered previously in the called telephone to the calling telephone, the calling telephone can be informed of the operating state of the called telephone. Accordingly, unlike the related art in which operating state informing data are registered in a network system, a user can be informed of the operating state of the called telephone in the user's original representation form. Accordingly, it is possible to improve service of the user.

Furthermore, in the case where this invention to achieve the above-described object is viewed from another point of view, this invention has a construction in which operating state informing data indicative of operating states are previously registered, and in a case where a wireless telephone receives call setting accepted data after having originated a call, the wireless telephone informs an operating state of a called telephone on the basis of operating state informing data corresponding to the received call setting accepted data from among the registered operating state informing data.

According to this construction, in the case where the wireless telephone receives the call setting accepted data from the called telephone or a network system which is a transit system, the wireless telephone informs the operating state of the called telephone on the basis of the operating state informing data registered in the wireless telephone. Accordingly, a user of a calling wireless telephone can be informed of the operating state of the called telephone in the user's original representation form. Accordingly, it is possible to improve service for the user.

Furthermore, in the case where this invention to achieve the above-described object is viewed from another point of view, this invention has the following construction. Operating state informing data indicative of operating states inputted to wireless telephones are transmitted to a network system and are registered in the network system in the state of being associated with the respective wireless telephones. In a case where a call is originated from a calling wireless telephone to a called wireless telephone and call setting accepted data from the called wireless telephone is received by the network system, operating state informing data corresponding to an operating state of the called wireless telephone from among operating state informing data registered in the state of being associated with the calling or called wireless telephone is transmitted from the network system to the calling wireless telephone and the calling wireless telephone informs the operating state corresponding to the operating state informing data.

According to this construction, the operating state informing data inputted from the wireless telephone and registered in the network system is transmitted to the calling mobile telephone. Accordingly, unlike the related art in which operating state informing data are previously registered in the network system in such a manner that a user of the wireless telephone cannot at all touch them, the user can be informed of the operating state of the called telephone in the user's original representation form. Accordingly, with this construction as well, it is possible to improve service of the user.

DETAILED DESCRIPTION OF A PREFERRED EMBODIMENTS

Embodiments of the invention will be described below in detail with reference to the accompanying drawings.

Embodiment 1

Figure 1:
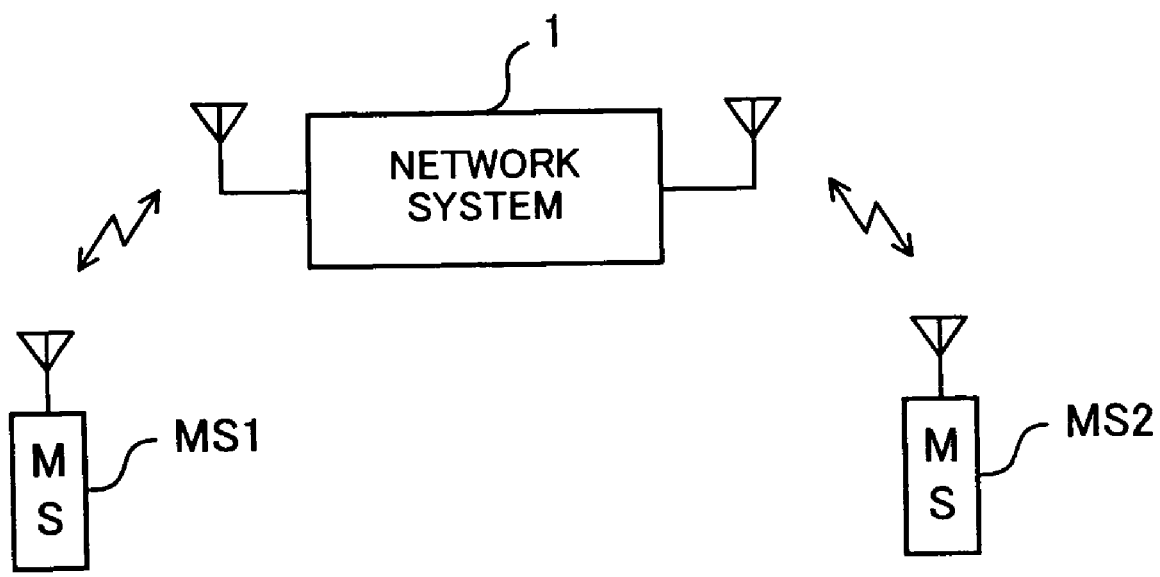
FIG. 1 is a conceptual diagram showing the entire construction of a mobile telephone system using wireless telephones according to embodiment 1 of the invention.

FIG. 1 is a conceptual diagram showing the entire construction of a mobile telephone system using wireless telephones according to embodiment 1 of the invention. This mobile telephone system conforms to, for example, 3G (3 Generation) standards such as W-CDMA, UMTS (Universal Mobile Telecommunication System) and cdma2000, 2.5G (2.5 Generation) standards such as IS-95, or 2G (2 Generation) standards such as PDC (Personal Digital Cellular) and GSM (Global System for Mobile Communications), and is provided with a plurality of mobile telephones MS1 and MS2 (hereinafter also referred to generally as "mobile telephone MS") and a network system 1.

Figure 2:
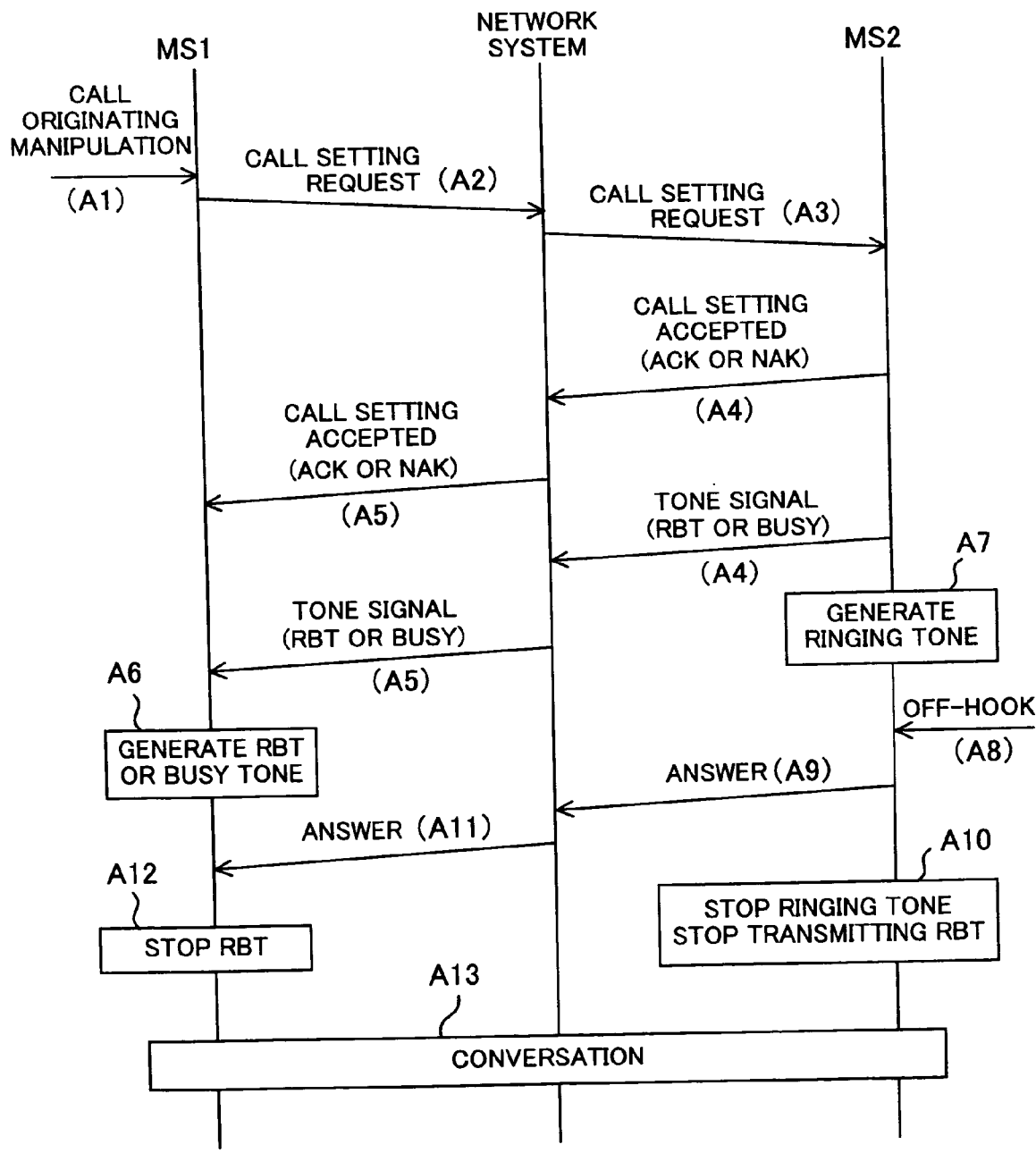
FIG. 2 is a sequence diagram for explaining call setting processing in the above-described mobile telephone system.

FIG. 2 is a sequence diagram for explaining call setting processing in the above-described mobile telephone system. For example, consideration will be given to a case where a call is made from one mobile telephone (hereinafter referred to as "calling mobile telephone", as the need arises) MS1 to another mobile telephone (hereinafter referred to as "called mobile telephone", as the need arises) MS2.

In this case, when a call originating manipulation is performed on the calling mobile telephone MS1, the called mobile telephone MS2 transmits tone data previously registered therein (operating state informing data) to the calling mobile telephone MS1. This transmitted tone data is received by the calling mobile telephone MS1. The calling mobile telephone MS1, on the basis of this received tone data, informs a user of the operating state of the called mobile telephone MS2.

Here, the above-described tone data indicates the operating state of the called mobile telephone. Specifically, the tone data includes RBT data corresponding to a ring back tone (RBT) indicative of a calling state, and busy tone data corresponding to a busy tone indicative of a busy state. These RBT data and busy tone data are represented in mutually different representation forms (melody or sound).

In this manner, in this embodiment 1, the calling mobile telephone MS1 can generate an RBT and a busy tone in the representation form specified by a user of the called mobile telephone MS2.

A further detailed description will be given below. The user of the calling mobile telephone MS1 performs a call originating manipulation (A1). Specifically, the user identifies a telephone number of the called mobile telephone MS2 by manipulating ten keys or calling the telephone number from a memory, and subsequently manipulates an originating key. The calling mobile telephone MS1 wirelessly transmits call setting request data in response to the above-described call originating manipulation (A2). Specifically, the calling mobile telephone MS1 wirelessly transmits to the network system 1 a call setting request signal which contains the call setting request data and identification data on the calling and called mobile telephones.

The network system 1, when it receives the above-described call setting request signal, wirelessly transfers the above-described call setting request signal to the called mobile telephone MS2 (A3). The called mobile telephone MS2, when it receives the call setting request signal, wirelessly transmits a call setting accepted signal and a predetermined tone signal to the network system 1 (A4).

More specifically, the called mobile telephone MS2 transmits to the network system 1 the call setting accepted signal and the tone signal which correspond to an operating state in which the called mobile telephone MS2 is placed when it receives the above-described call setting request signal. Far more specifically, if the called mobile telephone MS2 is placed in an idle state when it receives the above-described call setting request signal, the called mobile telephone MS2 transmits to the network system 1 a call setting accepted signal (ACK signal) which contains call setting accepted data (ACK data) corresponding to the idle state and identification data on the called mobile telephone MS2. In addition, the called mobile telephone MS2 reads RBT data corresponding to the idle state from previously registered tone data, and generates a tone signal (RBT signal) containing the RBT data. Subsequently, the called mobile telephone MS2 repeatedly transmits the RBT signal to the network system 1.

On the other hand, in the case where the called mobile telephone MS2 is in a busy state, the called mobile telephone MS2 transmits to the network system 1 a call setting accepted signal (NAK signal) which contains call setting accepted data (NAK data) corresponding to the busy state and the identification data on the called mobile telephone MS2. In addition, the called mobile telephone MS2 reads busy tone data corresponding to the busy state from the previously registered tone data, and generates a tone signal (busy signal) containing the tone data. Subsequently, the called mobile telephone MS2 repeatedly transmits the busy signal to the network system 1.

The network system 1, when it receives the call setting accepted signal and the tone signal, transfers the call setting accepted signal and the tone signal to the calling mobile telephone MS1 (A5). The calling mobile telephone MS1, when it receives the tone signal, generates a sound corresponding to the tone data in the tone signal (A6) Specifically, in the case where the calling mobile telephone MS1 receives the RBT signal, the calling mobile telephone MS1 generates an RBT. In the case where the calling mobile telephone MS1 receives the busy tone signal, the calling mobile telephone MS1 generates a busy tone. In this manner, the user of the calling mobile telephone MS1 can be informed of the calling state or the busy state with the user's original melody or sound of the called mobile telephone MS2.

In the case where the called mobile telephone MS2 is in the idle state, the called mobile telephone MS2 transmits the ACK signal and the RBT signal as described above, and generates a ringing tone to inform the user that the called mobile telephone MS2 has received a call (A7). When the called mobile telephone MS2 is set off-hook by the user (A8), the called mobile telephone MS2 transmits an answer signal to the network system 1 (A9). In addition, the called mobile telephone MS2 stops generating the ringing tone and stops transmitting the tone signal (RBT signal) that has continued to be transmitted up to that time (A10).

The network system 1 transmits the above-described answer signal to the calling mobile telephone MS1 (A11). In response to the reception of the above-described answer signal, the calling mobile telephone MS1 stops the RBT (A12). In this manner, the setting of a call is completed and the calling mobile telephone MS1 and the called mobile telephone MS2 are brought into a conversation-possible state (A13).

In the case where the called mobile telephone MS2 is busy, the called mobile telephone MS2 transmits the NAK signal and the busy signal as described previously. In this case, the busy signal is repeatedly transmitted. On the other hand, in this case, it is expected that the user of the calling mobile telephone MS1 will hang up. Accordingly, the called mobile telephone MS2 stops transmitting the above-described busy signal in response to the reception of a disconnection request signal (not shown).

Figure 3:
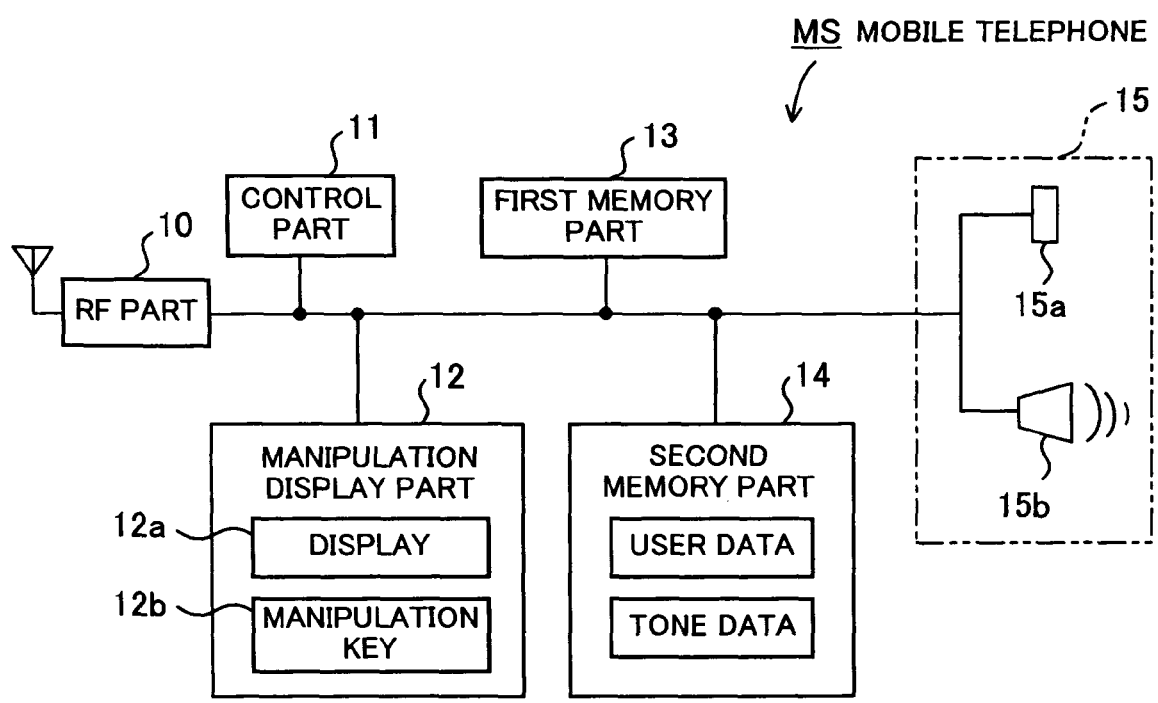
FIG. 3 is a block diagram showing the internal construction of a mobile telephone.

FIG. 3 is a block diagram showing the internal construction of the mobile telephone MS. The mobile telephone MS is provided with a wireless (RF) part 10, a control part 11, a manipulation display part 12, a first memory part 13, a second memory part 14, and an acoustic part 15. The RF part 10 executes transmission/reception processing and modulation/demodulation processing of wireless signals and the like. The control part 11 is made of a CPU and the like, and controls the wireless (RF) part 10, the manipulation display part 12, the first and second memory parts 12 and 14, and the acoustic part 15. The manipulation display part 12 is provided with a display 12a and manipulating keys 12b. The display 12a is, for example, a liquid crystal display. The manipulating keys 12b includes a call originating key, a call terminating key, function keys, ten keys and the like.

The acoustic part 15 is provided with a microphone 15a and a speaker 15b. In addition, the acoustic part 15 converts an analog voice signal inputted via the microphone 15a into a digital voice signal and gives the digital voice signal to the control part 11, or converted an input digital signal into an analog signal and outputs the analog signal from the speaker 15b.

The first memory part 13 is made of, for example, a ROM (Read Only Memory), and stores computer programs and various data in a non-volatile manner. The second memory part 14 is made of, for example, a flash memory, and stores various data in an electrically rewritable manner. Specifically, the second memory part 14 stores user data such as destination telephone numbers and destination mail addresses as well as tone data.

The tone data are registered in an area for tone data in the second memory part 14 of the called mobile telephone MS2, for example by tone data registration processing which will be described later. In this case, a plurality of tone data can be registered, and each of the data is associated with an identification code. Furthermore, in the case where a plurality of tone data are registered, the user can set any one tone data to be used, and in this case, use setting data is associated with the set tone data.

As described previously, the tone data includes the RBT data and the busy tone data. The RBT data is made of a melody and a sound. The busy tone data is made of a melody. These RBT data and busy tone data are, for example, ADPCM (Adaptive Differential Pulse Code Modulation) code data. ADPCM encoding is the processing of encoding data by extracting a difference between consecutive codes, and can compress the amount of data compared to simple PCM codes. Accordingly, in this embodiment 1, the storage capacity of the tone data can be made small. In addition, as described above, since the tone data is transmitted to the calling mobile telephone, embodiment 1 also contributes to a reduction in the amount of data transmission.

Figure 4:
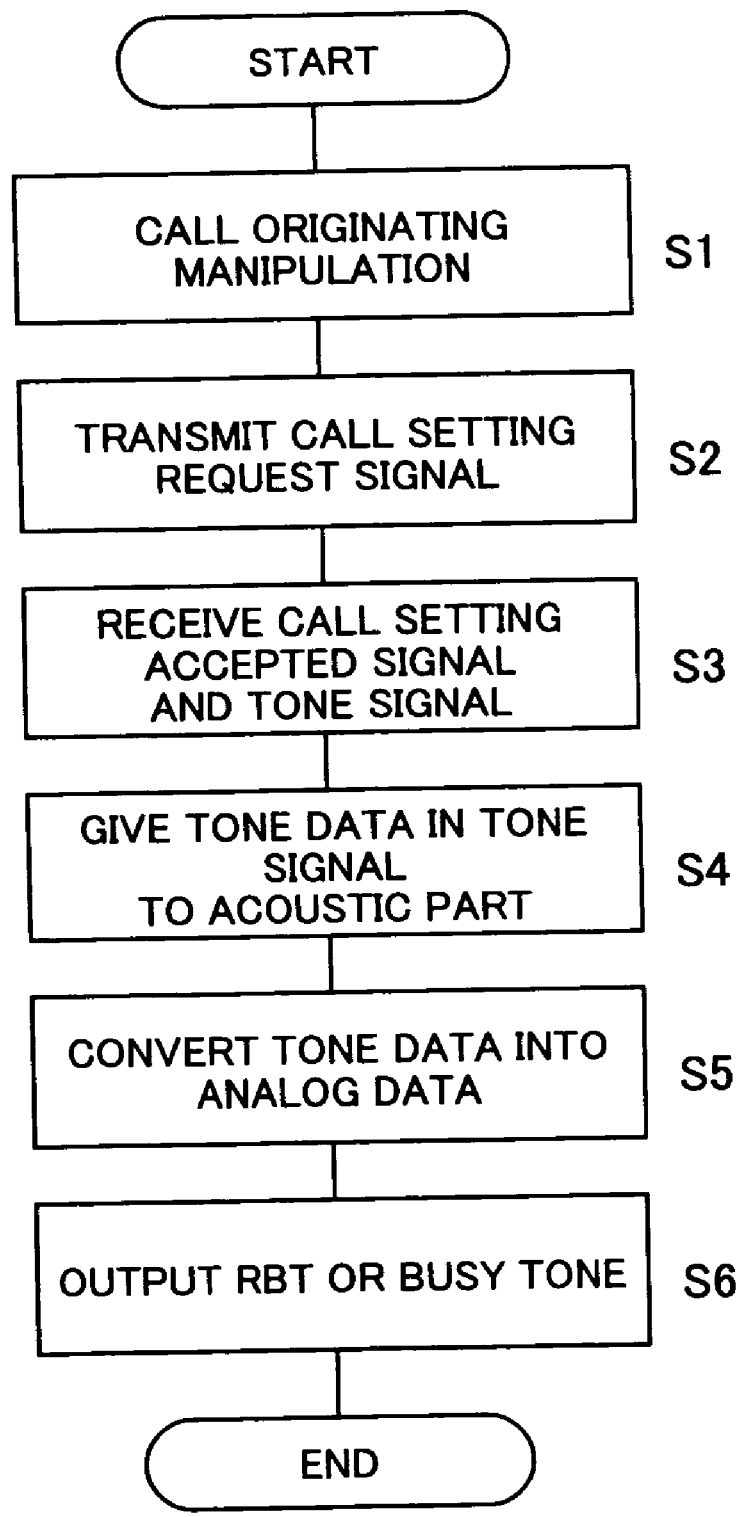
FIG. 4 is a flowchart for explaining processing for call origination.

FIG. 4 is a flowchart for explaining processing for call origination. In the case where a user is to call another mobile telephone, the user executes a call originating manipulation (Step S1). Specifically, the user first manipulates the manipulating keys 12b to identify a designation telephone number. More specifically, the user inputs numbers by manipulating the ten keys or displays on the display 12a a registered destination telephone number registered by manipulating a function key. Subsequently, the user manipulates the call originating key. Consequently, the manipulation display part 12 gives the RF part 10 call setting request data containing the telephone number information. The RF part 10 generates and amplifies a call setting request signal by modulating a high frequency signal oscillated by a local oscillator (not shown) on the basis the originating data, and subsequently transmits the call setting request signal (Step S2).

After that, when a call setting accepted signal and a tone signal from the network system 1 are received by the RF part 10 (Step S3), the RF part 10 restores call setting accepted data by amplifying and then demodulating the call setting accepted signal. In addition, the RF part 10 restores tone data by amplifying and then demodulating the tone signal. The RF part 10 gives these restored data to the control part 11. The control part 11 gives the acoustic part 15 the tone data from among these given data (Step S4).

When the acoustic part 15 is given the tone data by the control part 11, the acoustic part 15 decodes the tone data. Specifically, since the tone data is ADPCM-coded, the acoustic part 15 restores this ADPCM code to an original analog signal (Step S5). The acoustic part 15 gives the restored analog signal to the speaker 15*b*. Consequently, a sound corresponding to the tone data is outputted from the speaker 15*b*. In this manner, an RBT or a busy tone is generated (Step S6).

Figure 5:
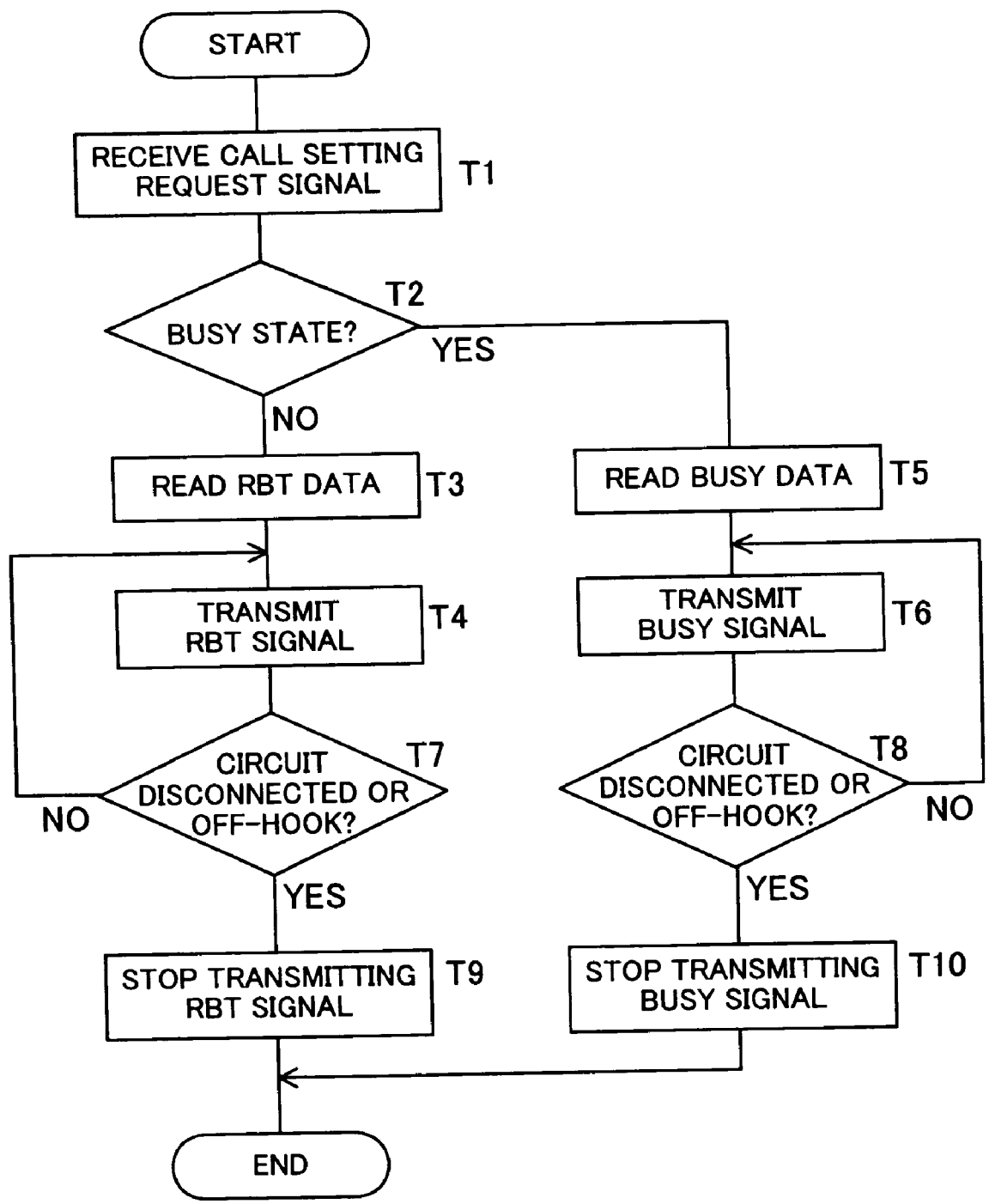
FIG. 5 is a flowchart for explaining processing for call termination.

FIG. 5 is a flowchart for explaining processing for call termination. When the RF part 10 receives a call setting request signal from the network system 1 (Step T1), the RF part 10 restores call setting request data by amplifying and then demodulating the call setting request signal, and gives the call setting request data to the control part 11. The control part 11, when it receives the call setting request data, checks the operating state of the mobile telephone MS itself. Specifically, the control part 11 determines whether the mobile telephone MS is busy (Step T2).

If the mobile telephone MS is not busy, the control part 11 accesses the second memory part 14, and reads RBT data from among the tone data registered in the second memory part 14 (Step T3). In this case, if a plurality of RBT data are registered, the control part 11 reads RBT data with which use setting data is associated. Furthermore, the control part 11 gives ACK data and the above-described extracted RBT data to the RF part 10.

The RF part 10 generates and transmits an ACK signal by modulating a high frequency signal on the basis of the ACK data, and also generates and transmits an RBT signal by modulating a high frequency signal on the basis of the RBT data (Step T4). Incidentally, the control part 11 gives the RBT data to the RF part 10 not only once but also continuously at predetermined periods. Accordingly, the RBT signal is continuously transmitted from the RF part 10.

On the other hand, if the mobile telephone MS is busy, the control part 11 accesses the second memory part 14, and reads busy tone data from among the tone data registered in the second memory part 14 (Step T5). In this case, if a plurality of busy tone data are registered, the control part 11 reads busy tone data with which use setting data is associated. In addition, the control part 11 gives NAK data and the above-described extracted busy tone data to the RF part 10. The RF part 10 generates and transmits a NAK signal on the basis of the NAK data, and also generates and transmits a busy signal on the basis of the busy tone data (Step T6). In this case as well, the control part 11 gives the busy tone data to the RF part 10 continuously at predetermined periods, so that the busy signal is continuously transmitted from the RF part 10.

The control part 11, after having started to give the RF part 10 the tone data, determines whether circuit disconnection has occurred or the mobile telephone MS has been set off-hook (Steps T7, T8). If the control part 11 determines that circuit disconnection has occurred or the mobile telephone MS has been set off-hook, the control part 11 stops transmitting the above-described RBT data or busy tone data to the RF part 10 (Steps T9, T10).

Figure 6:
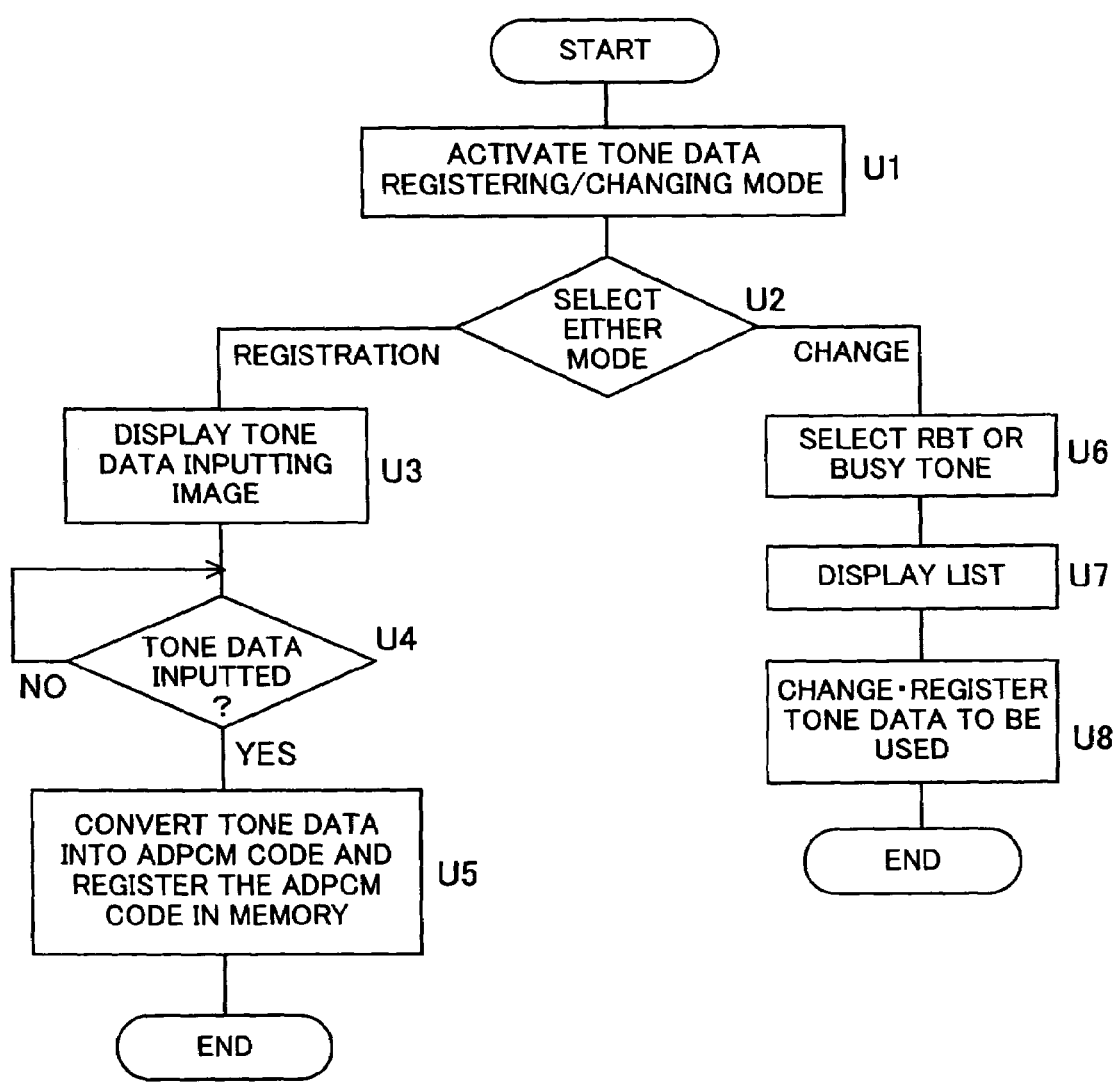
FIG. 6 is a flowchart for explaining tone data registration processing.

FIG. 6 is a flowchart for explaining tone data registration processing. In this embodiment 1, this tone data registration processing can be executed on only the called mobile telephone. In the case where tone data is to be registered, the user manipulates a function key, and activates a tone data registering/changing mode as an operating mode of the mobile telephone MS (Step U1). When this mode is activated, the control part 11 of the mobile telephone MS displays on the display 12*a* a image for selecting either of the tone data registering/changing mode (Step U2).

In the case where the tone data registering mode is selected, the control part 11 displays on the display 12*a* a image which urges the user to input tone data (Step U3). When this image is displayed, the user inputs tone data into the mobile telephone MS (Step U4). Specifically, the user connects the mobile telephone MS to a computer such as a personal computer, and transfers melody data stored in the computer to the mobile telephone MS. In addition, the user connects the computer to the Internet or the like, and downloads melody data stored in a server on the Internet, and transmits the melody data from the computer to the mobile telephone MS. Further, the user directly connects to the Internet from the mobile telephone MS, and downloads melody data stored in a server on the Internet. Furthermore, to create RBT data, the user records a voice such as "please wait for a while" via the microphone 15*a*.

The melody data or voice data inputted into the mobile telephone MS in this manner is given to the control part 11. The control part 11, after having converted this tone data into an ADPCM code, associates an identification code with the tone data and registers the tone data in the area for tone data of the second memory part 14 (Step U5). In this manner, an original tone data suited to the user's preference can be registered in the mobile telephone MS.

On the other hand, in the case where the tone data changing mode is selected, the control part 11 of the mobile telephone MS displays on the display 12*a* an image which asks which of an RBT and a busy tone is to be changed (Step U6). In the case where either of an RBT and a busy tone is selected as by a cursor being manipulated by the user, the control part 11 creates a list of data selected from the tone data registered in the second memory part 14, and displays on the display 12*a* an image which enables any data to be selected from this list (Step U7). In the case where any data is selected by the user, the control part 11 registers the selected data in the second memory part 14 as data which is set for use (Step U8). Namely, the control part 11 stores the newly selected tone data in the second memory part 14 with the use setting data associated with the newly selected tone data. Accordingly, the subsequent RBT or busy tone is generated with a changed melody or voice.

As described above, according to this embodiment 1, RBT data and busy tone data suited to the user's preference can be registered in the called mobile telephone MS2. Therefore, unlike the prior art of registering tone data in the network system 1, an RBT and a busy tone can be easily generated or changed by users themselves. Accordingly, it is possible to provide services suited to the user' preference, whereby it is possible to improve service for the user.

Embodiment 2

Figure 7:
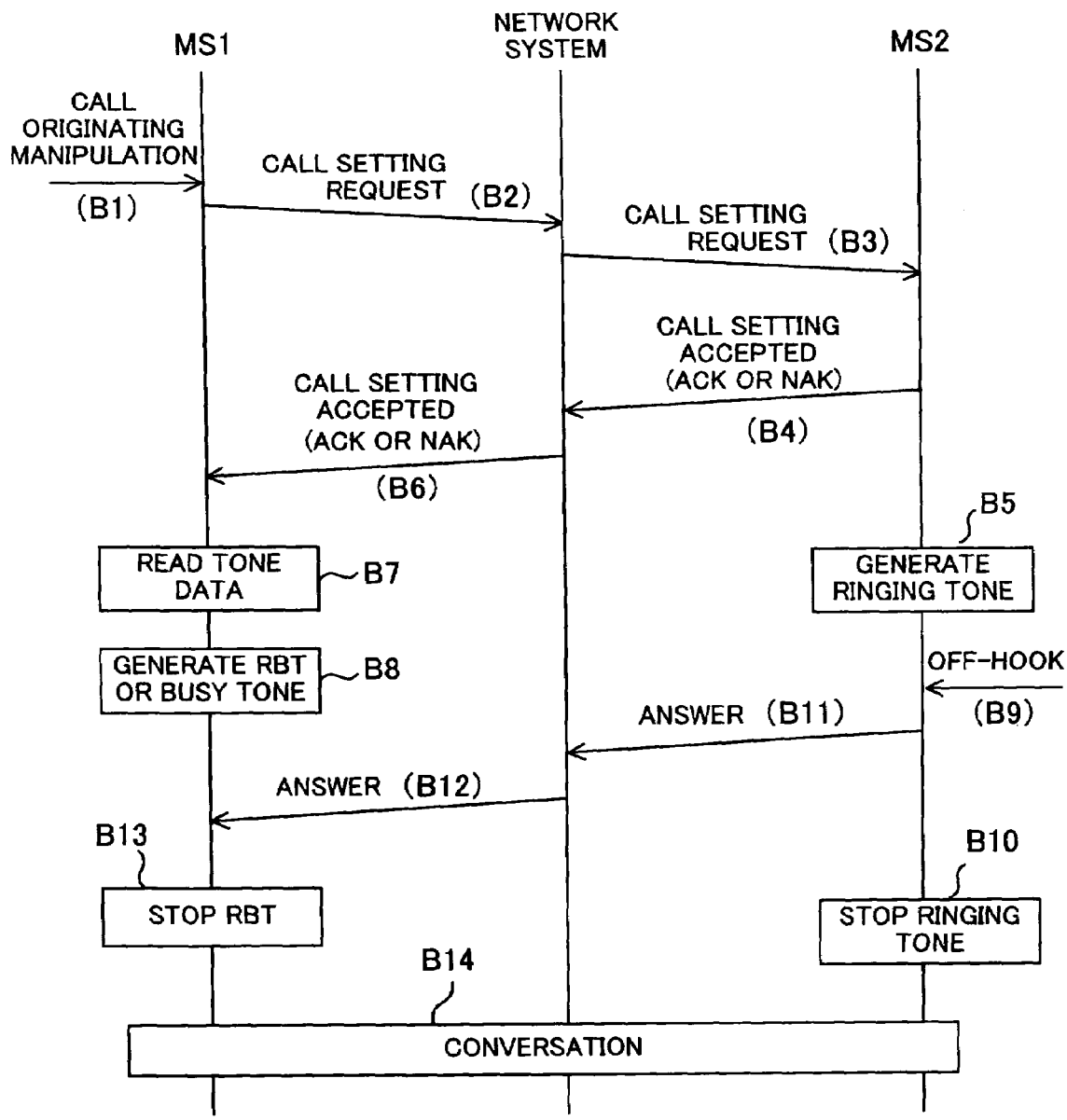
FIG. 7 is a sequence diagram for explaining processing during call setting in a mobile telephone system according to embodiment 2 of this invention.

FIG. 7 is a sequence diagram for explaining processing during call setting in a mobile telephone system according to embodiment 2 of the invention.

In the above-described embodiment 1, the tone data registered in the called mobile telephone MS2 is transmitted to the calling mobile telephone MS1, whereby the user's original melody or sound of the called mobile telephone MS2 is generated from the calling mobile telephone MS1. In contrast, in this embodiment 2, tone data is previously registered not in the called mobile telephone MS2 but in the calling mobile telephone MS1, and in the case where the calling mobile telephone MS1 receives call setting accepted data after having originated a call, the calling mobile telephone MS1 generates an RBT or a busy tone on the above-described registered tone data. In this manner, the user of the calling mobile telephone MS1 can hear an original RBT or busy tone suited to the user's preference from his/her own mobile telephone MS. Accordingly, it is possible to improve service for the user of the calling mobile telephone MS1.

More specifically, when a call originating manipulation is performed (B1), the calling mobile telephone MS1 transmits a call setting request signal to the network system 1 (B2), and the network system 1 transmits the call setting request signal to the called mobile telephone MS2 (B3). Unlike in embodiment 1, the called mobile telephone MS2, when it receives the call setting request signal, does not transmit a tone signal, and transmits only a call setting accepted signal containing ACK data or NAK data to the network system 1 (B4). In addition, in the case where the called mobile telephone MS2 is in a conversation-possible state, the called mobile telephone MS2 generates a ringing tone (B5). The network system 1, when it receives the call setting accepted signal, transmits the call setting accepted signal to the calling mobile telephone MS1 (B6).

The RF part 10 of the calling mobile telephone MS1 receives the above-described call setting accepted signal. Namely, the calling mobile telephone MS1 receives call setting accepted data after having originated a call. The control part 11 of the calling mobile telephone MS1, when it receives the call setting accepted signal, reads tone data corresponding to the above-described received call setting accepted data from among the tone data previously registered in the second memory part 14 of the calling mobile telephone MS1, on the basis of the call setting accepted data in the call setting accepted signal (B7). Specifically, in the case where the ACK data is received as the call setting accepted data, the control part 11 reads RBT data from the second memory part 14. In the case where the NAK is received, the control part 11 reads busy tone data from the second memory part 14. In this case, if a plurality of RBT data or busy tone data are registered, the control part 11, like in embodiment 1, selects RBT data or busy tone data with which use setting data is associated.

The control part 11 gives the above-described extracted RBT data or busy tone data to the acoustic part 15. The acoustic part 15 converts the RBT data or busy tone data into an analog signal, and gives the analog signal to the speaker 15b. Consequently, an RBT or a busy tone corresponding to the above-described RBT data or busy tone data is outputted from the speaker 15b (B8). In this case, like in embodiment 1, since the control part 11 repeatedly gives the RBT data or the busy tone data to the acoustic part 15, the RBT or the busy tone is repeatedly outputted. In this manner, the calling mobile telephone MS1 informs the user of a tone corresponding to the operating state of the called mobile telephone MS2.

After the call setting accepted signal containing the ACK data has been transmitted, if an off-hook manipulation is performed on the called mobile telephone MS2 (B9), the called mobile telephone MS2 stops the ringing tone (B10), and transmits an answer signal to the calling mobile telephone MS1 via the network system 1 (B11, B12). In response to the reception of this answer signal, the control part 11 of the calling mobile telephone MS1 disables the processing of giving the RBT data to the acoustic part 15 (B12). Therefore, the RBT comes to a stop. Subsequently, a conversation is initiated (B13)

As described above, according to this embodiment 2, it is possible to generate the RBT and the busy tone on the basis of the tone data previously registered in the calling mobile telephone MS1. Accordingly, the user of the calling mobile telephone MS1 can freely register a sound which the user prefers, whereby it is possible to improve service for the user.

Furthermore, unlike the case of embodiment 1, tone data need not be previously registered in the called mobile telephone MS2, whereby even if the user is to call a mobile telephone already shipped to the market, RBT and a busy tone suited to the user's preference can be provided to the user. Accordingly, embodiment 2 can be put to practical use more easily than embodiment 1. In addition, since a tone signal need not be transmitted, it is possible to reduce traffic.

Embodiment 3

Figure 8:
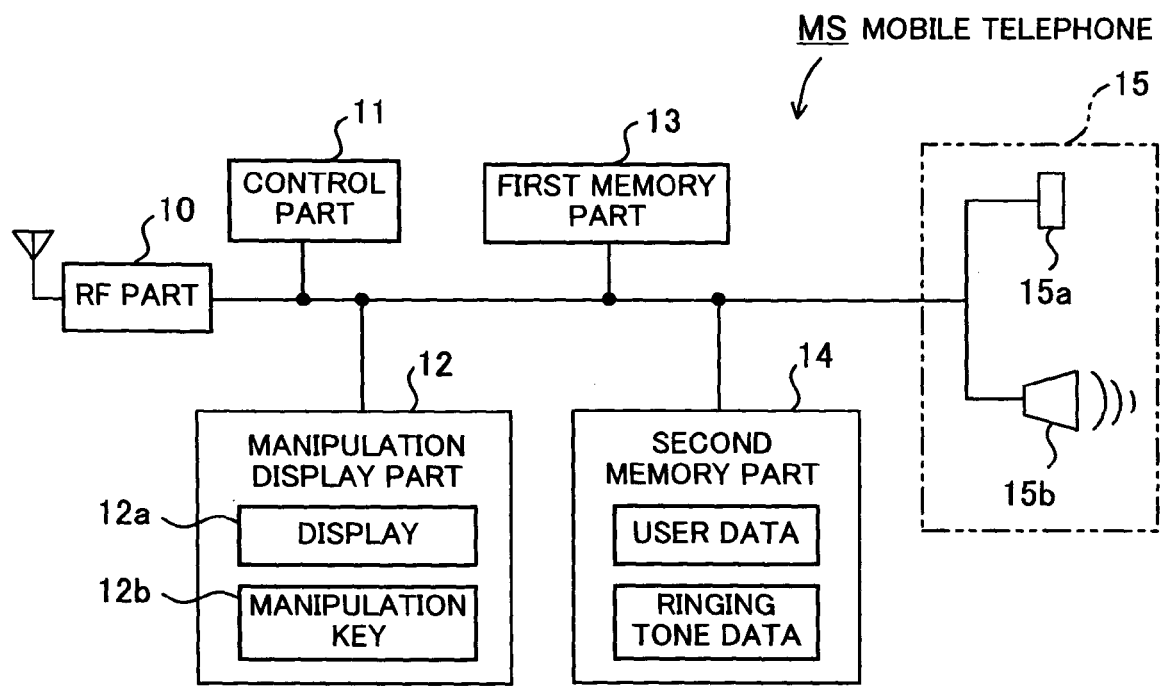
FIG. 8 is a block diagram showing the internal construction of the mobile telephone according to this embodiment 3.

FIG. 8 is a block diagram showing the internal construction of the mobile telephone MS according to embodiment 3. In FIG. 8, the same reference numerals are used to denote the same functional parts as those shown in FIG. 3.

In the above-described embodiment 1 or 2, dedicated tone data are registered in the mobile telephone MS as RBT and busy tone. In contrast, in this embodiment 3, ringing tone data already registered in the mobile telephone MS as data for generating a ringing tone is utilized as data for RBT or busy tone. Accordingly, embodiment 3 has the advantage that the mobile telephone MS does not need a storage area dedicated to tone data.

More specifically, ringing tone data, in addition to user data, is stored in the second memory part 14 of the mobile telephone MS according to this embodiment 3. The ringing tone data is data on a ringing tone to be generated when an incoming call is received, and, for example, is stored previously or is stored by being downloaded from the Internet. The ringing tone data is associated with either of RBT or busy tone. That is to say, the ringing tone data is associated with the operating state of the mobile telephone MS.

A case where tone data is transmitted from the called mobile telephone MS2 to the calling mobile telephone MS1 as in embodiment 1 will be described by way of example. When the called mobile telephone MS2 is in an idle state in the case where the called mobile telephone MS2 receives a call setting request signal, the control part 11 of the called mobile telephone MS2 reads ringing tone data from the second memory part 14, and generates a ringing tone corresponding to the ringing tone data. In addition, the control part 11 reads ringing tone data corresponding to an RBT from the second memory part 14, and gives the ringing tone data to the RF part 10 as RBT data. Consequently, the RF part 10 generates a tone signal containing the RBT data, and transmits the tone signal to the calling mobile telephone MS1 via the network system 1. The calling mobile telephone MS1 generates an RBT corresponding to the RBT data (ringing tone data) in this received tone signal.

On the other hand, when the called mobile telephone MS2 is in a busy state, the control part 11 of the called mobile telephone MS2 reads ringing tone data associated with a busy tone from the second memory part 14, and gives the ringing tone data to the RF part 10 as busy tone data. Consequently, the RF part 10 generates a tone signal containing the busy tone data, and transmits the tone signal to the calling mobile telephone MS1 via the network system 1. The calling mobile telephone MS1 generates a busy tone corresponding to the busy tone data (ringing tone data) in this received tone signal.

A case where a tone is generated on the basis of tone data registered in the calling mobile telephone MS1 as in the above-described embodiment 2 will be described below by way of example. In the case where the calling mobile telephone MS1 receives call setting accepted data from the called mobile telephone MS2 via the network system 1, the calling mobile telephone MS1 reads ringing tone data corresponding to the call setting accepted data from the second memory part 14 as tone data. Specifically, in the case where the call setting accepted data is ACK data, the control part 11 of the calling mobile telephone MS1 reads ringing tone data associated with an RBT from the second memory part 14. In the case where the call setting accepted data is NAK data, the control part 11 reads ringing tone data associated with a busy tone from the second memory part 14. The control part 11 gives this read ringing tone data to the acoustic part 15. Consequently, a ringing tone corresponding to the above-described ringing tone data is generated from the speaker 15b of the acoustic part 15.

As described above, according to this embodiment 3, since the ringing tone data already registered in the mobile telephone MS is utilized as tone data, a storage area dedicated to tone data can be eliminated. In addition, since work for registering tone data can be omitted, it is possible to save the user's trouble.

Embodiment 4

Figure 9:
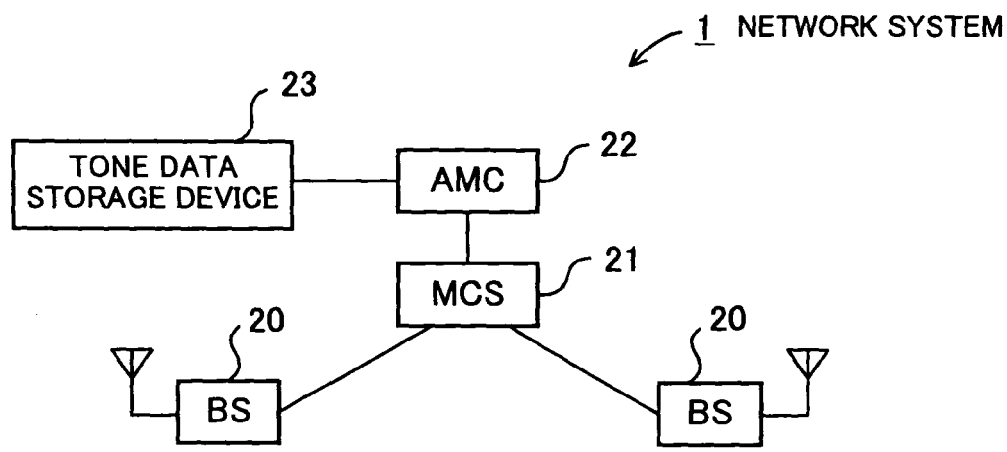
FIG. 9 is a schematic block diagram showing the construction of a network system according to embodiment 4 of this invention.

FIG. 9 is a schematic block diagram showing the construction of the network system 1 according to embodiment 4 of this invention.

In the above-described embodiment 1 or 2, tone data is registered in the mobile telephone MS. The reason for this is to enable the user to newly create or change tone data. Stated in the opposite way, if the user can create or change tone data, a place in which to register tone data need not necessarily be the mobile telephone MS. For this reason, in this embodiment 4, registering/changing processing for tone data is made executable exclusively on the side of the mobile telephone MS, and the network system 1 is made a place in which to register the tone data.

More specifically, the network system 1 is provided with a plurality of base stations (BS: Base Station) 20 which performs wireless communication with the mobile telephone MS, a mobile control station (MCS: Mobile Control Station) 21 which controls this plurality of base stations 20, and an automobile switching center (AMC: Automobile Switching Center) 22 which is connected to the mobile control station 21. The automobile switching center 22 is connected to another automobile switching center and another communication network, and executes circuit routing processing.

The network system 1 is also provided with a tone data storage device 23. The tone data storage device 23 stores tone data transmitted from the mobile telephone MS. More specifically, the tone data storage device 23 is connected to the automobile switching center 22. The tone data storage device 23 corresponds to, for example, a part of the storage area of a home memory which stores detailed information on the user of the mobile telephone MS. Control of writing and reading of tone data to and from the tone data storage device 23 is performed by the automobile switching center 22.

Figure 10:
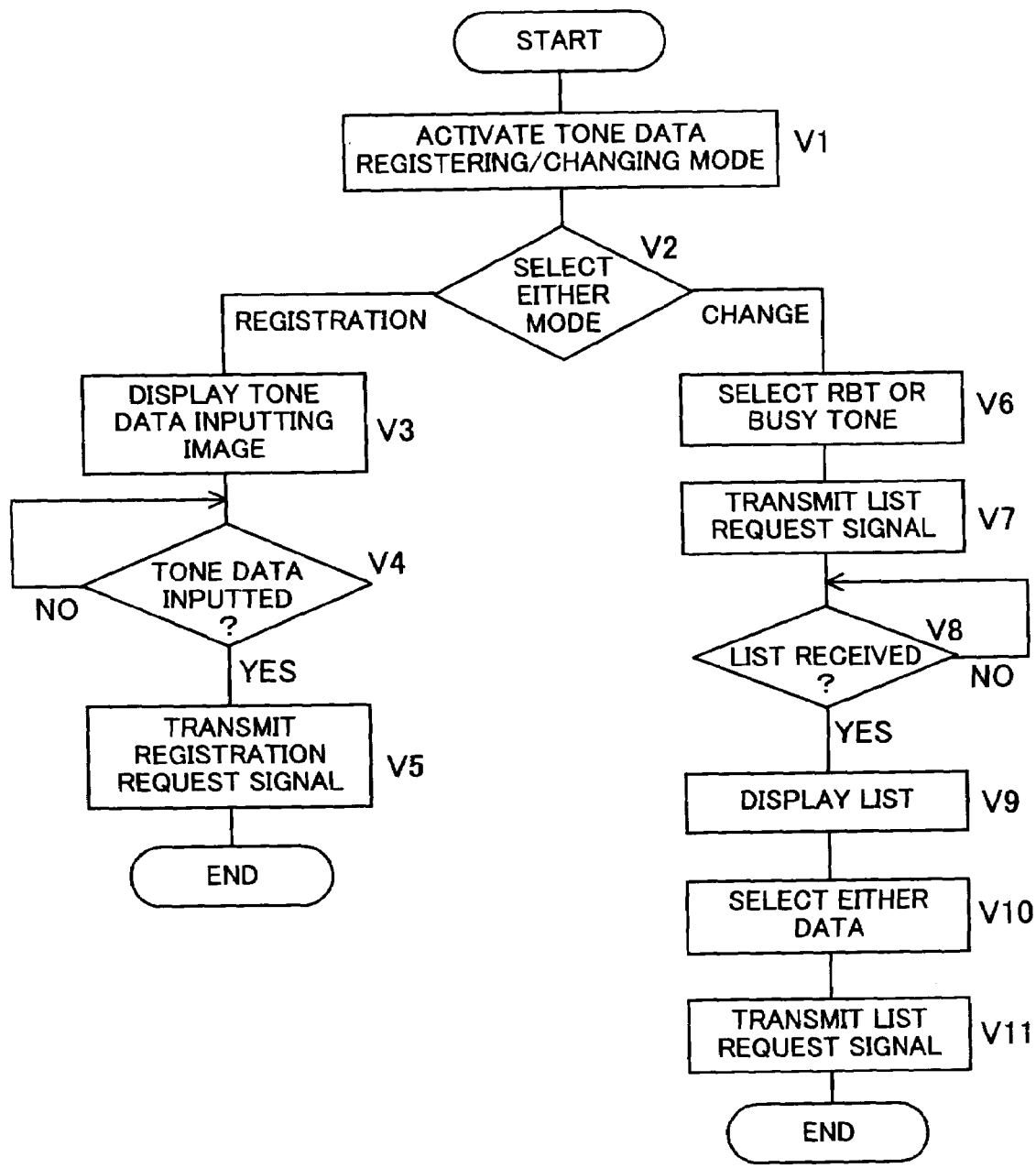
FIG. 10 is a flowchart for explaining tone data registering/changing processing in the mobile telephone.

FIG. 10 is a flowchart for explaining tone data registering/changing processing in the mobile telephone MS. This tone data registering/changing processing can be executed from either of the calling mobile telephone MS1 and the called mobile telephone MS2. The user of the calling mobile telephone MS1 or the called mobile telephone MS2 manipulates a function key to set the operating mode of the mobile telephone to a tone data registering/changing mode (Step V1).

Subsequently, the user selects either of a registration mode and a changing mode similarly to the explanation of FIG. 6 (Step V2). In the case where the registering mode is selected, the control part 11 displays a tone data inputting image on the display 12a (Step V3), and when tone data is inputted (Step V4), the control part 11 gives the RF part 10 the tone data and identification data on the mobile telephone MS. Consequently, the RF part 10 generates a registration request signal containing the above-described tone data and mobile telephone identification data and transmits the registration request signal to the network system 1 (Step V5) In this manner, the user can request the network system 1 to register the tone data.

On the other hand, in the case where the changing mode is selected, the control part 11 displays on the display 12a an image for selecting either of an RBT and a busy tone (Step V6). When either is selected, the control part 11 gives list request data to the RF part 10 to acquire a list of the selected data. The RF part 10 transmits a list request signal containing the list request data to the network system 1 (Step V7).

Subsequently, when the control part 11 receives the list of registered tone data from the network system 1 (Step V8), the network system 1 displays the list on the display 12a (Step V9). When any of the data is selected by the user (Step V10), the control part 11 gives the RF part 10 change request data containing an identification code for identifying the selected data, and causes the RF part 10 to transmit a change request signal containing the above-described change request data to the network system 1 (Step V11). In this manner, the user can request the network system 1 to change tone data to be used.

Figure 11:
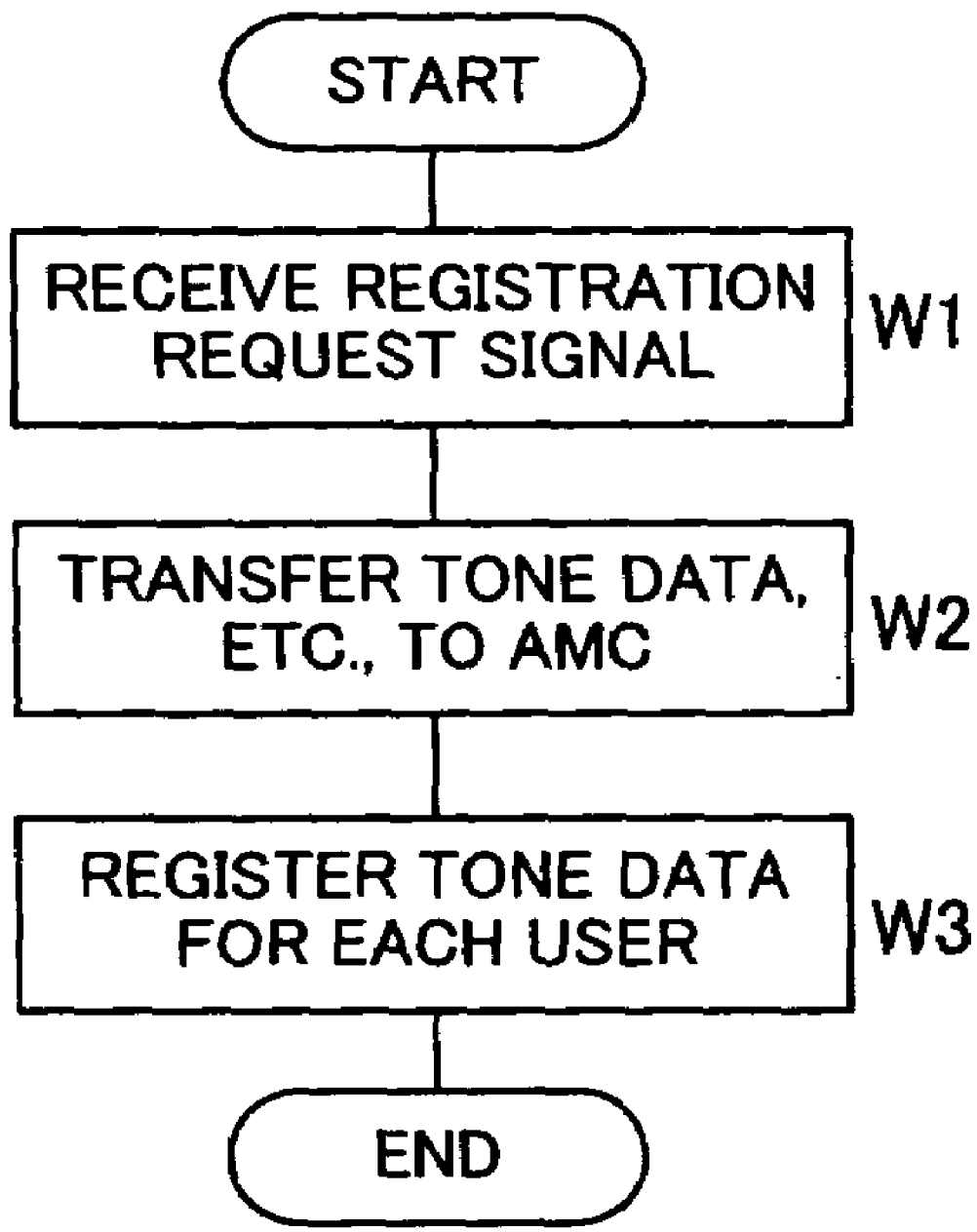
FIG. 11 is a flowchart for explaining the tone data registering/changing processing in the network system.

FIG. 11 is a flowchart for explaining the tone data registering/changing processing in the network system 1. When the base station 20 of the network system 1 receives the registration request signal transmitted from the mobile telephone MS (Step W1), the base station 20 restores the tone data and the mobile telephone identification data from the registration request signal, and transfers each of the data to the automobile switching center 22 via the mobile control station 21 (Step W2). The automobile switching center 22, when it receives each of the above-described data, stores the tone data into the tone data storage device 23 by using the mobile telephone identification data as an index (Step W3). Namely, the automobile switching center 22 registers tone data for each user. In other words, the automobile switching center 22 registers the tone data associated with the mobile telephone MS. In this manner, the registration of the tone data is completed.

Figure 12:
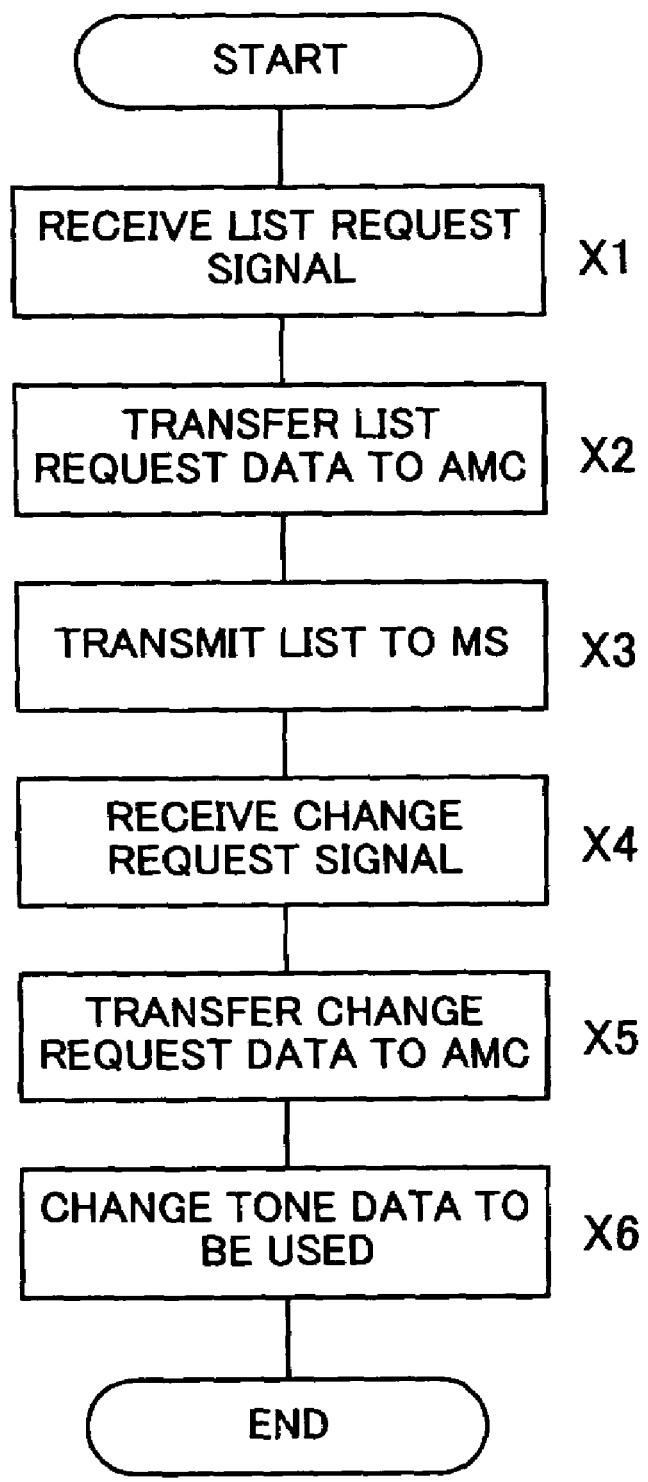
FIG. 12 is a flowchart for explaining the tone data changing processing in the network system.

FIG. 12 is a flowchart for explaining the tone data changing processing in the network system 1. When the base station 20 of the network system 1 receives the registration request signal transmitted from the mobile telephone MS (Step X1), the base station 20 restore the list request data from the list request signal, and transfers the list request data to the automobile switching center 23 via the mobile control station 21 (Step X2). The automobile switching center 22, when it receives this list request data, reads from the tone data storage device 23 a list of tone data corresponding to the mobile telephone MS which has transmitted the list request data, and works the list of tone data into list data, and subsequently transmits the list data to the mobile telephone MS via the mobile control station 21 and the base station 20 (Step X3).

After that, when the change request signal transmitted from the mobile telephone MS is received by the base station 20 (Step X4), the base station 20 restores the change request data from the change request signal, and transfers the change request data to the automobile switching center 22 via the mobile control station 21 (Step X5). The automobile switching center 22, when it receives the change request data, associates use setting data with tone data corresponding to an identification code indicated by the change request data (Step X6). In this manner, tone data to be used is changed.

Figure 13:
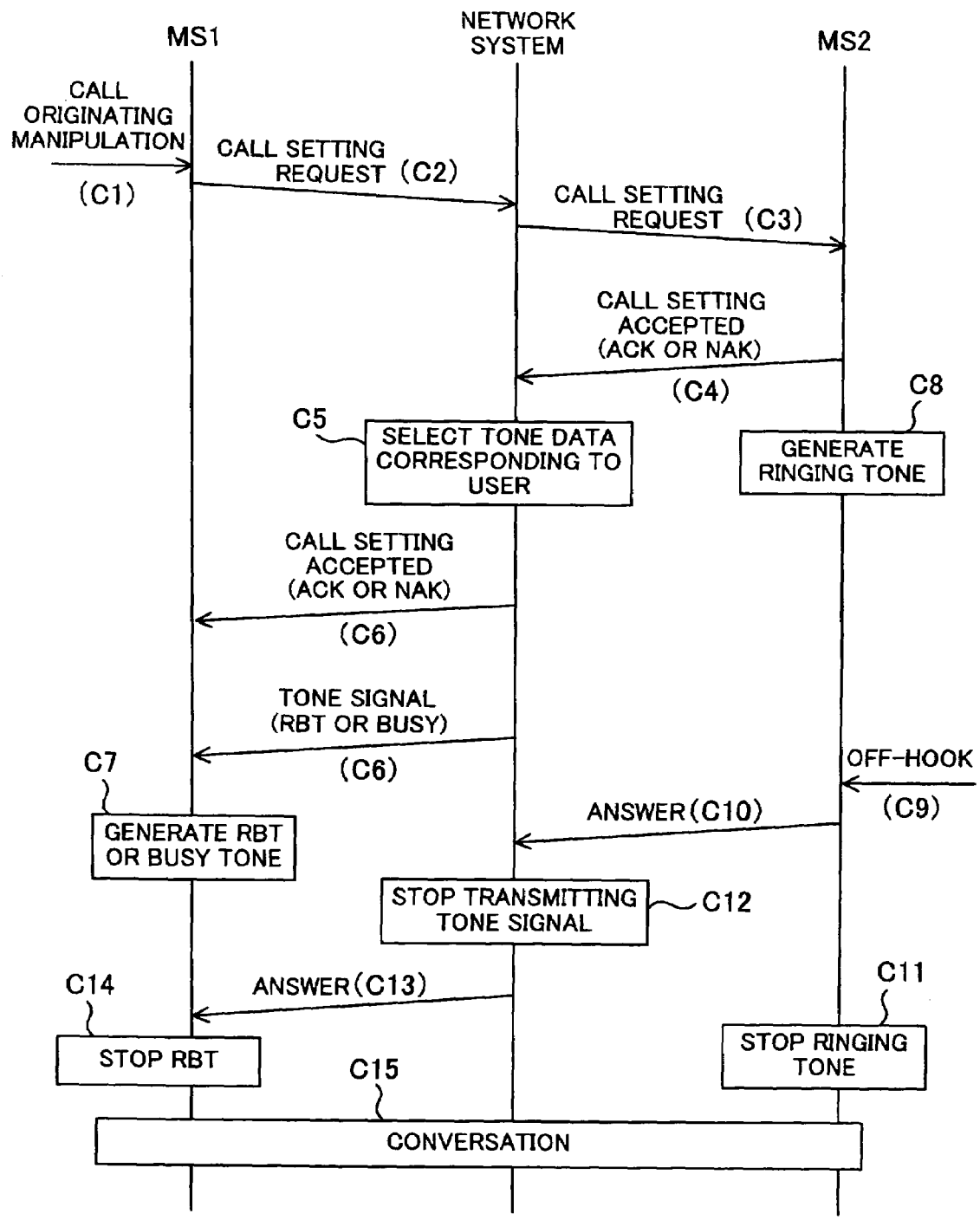
FIG. 13 is a sequence diagram for explaining call setting processing according to this embodiment 4.

FIG. 13 is a sequence diagram for explaining call setting processing according to this embodiment 4. The calling mobile telephone MS1, when a call originating manipulation is performed (C1), transmits a call setting request signal to the network system 1 (C2), and the network system 1 transmits the call setting request signal to the called mobile telephone MS2 (C3). The called mobile telephone MS2, when it receives the above-described call setting request signal, transmits a call setting accepted signal (an ACK signal or an NAK signal) to the network system 1 (C4).

The network system 1, when it receives the above-described call setting accepted signal, transmits to the calling mobile telephone MS1 tone data corresponding to the operating state of the called mobile telephone MS2 from among registered tone data associated with the calling mobile telephone MS1 or the called mobile telephone MS2. In other words, the network system 1, when it receives the above-described call setting accepted data, selects tone data corresponding to the user (C5), and transmits the tone data to the calling mobile telephone MS1 (C6).

More specifically, when the base station 20 of the network system 1 receives the call setting request signal transmitted from the calling mobile telephone MS1, the base station 20 extracts identification data on the calling mobile telephone MS1 and the called mobile telephone MS2 from the call setting request signal, and transfers the identification data to the automobile switching center 22 via the mobile control station 21 (Step W2). The automobile switching center 22 temporarily stores these identification data. Subsequently, in the case where the automobile switching center 22 receives the call setting accepted data from the base station 20 which has received the call setting accepted signal from the called mobile telephone MS2, the automobile switching center 22 refers to the above-described retained identification data, and reads tone data corresponding to the identification data from the tone data storage device 23.

More specifically, in the case where tone data for either one of the calling mobile telephone MS1 and the called mobile telephone MS2 is registered, the automobile switching center 22 reads the registered tone data corresponding to the mobile telephone MS. In this case, when a plurality of tone data are registered, the automobile switching center 22 reads tone data which is set for use.

In the case where tone data for both of the calling mobile telephone MS1 and the called mobile telephone MS2 are registered, the automobile switching center 22 gives priority to an improvement in service for the user on the call originating side, and reads tone data corresponding to the calling mobile telephone MS1. As a matter of course, if an improvement in service for the user on the call terminating side is to be regarded as important, the automobile switching center 22 may also read tone data corresponding to the called mobile telephone MS2.

The automobile switching center 22, when it reads the tone data in the above-described manner, transmits the above-described call setting accepted data and the above-described extracted tone data to the base station 20 communicating with the mobile telephone MS via the mobile control station 21. The base station 20 generates a call setting accepted signal containing the call setting accepted data and a tone signal containing the tone data to the calling mobile telephone MS1 (C6). Incidentally, the network system 1 transmits the call setting accepted signal only once, but continuously transmits the tone signal.

Then calling mobile telephone MS1, when it receives the call setting accepted signal and the tone signal, generates an RBT or a busy tone corresponding to the tone data contained in the tone signal (C7). As described above, the tone signal is continuously transmitted. In this manner, it is possible to continuously generate the RBT or the busy tone registered by the user of the calling mobile telephone MS1 or the called mobile telephone MS2.

In the meantime, if the called mobile telephone MS2 is in a conversation-possible state after having transmitted the call setting accepted signal, the called mobile telephone MS2 makes a ringing tone (C8), and when the called mobile telephone MS2 is set off-hook by the user (C9), the called mobile telephone MS2 transmits an answer signal to the network system 1 (C10), and stops the ringing tone (C11). The network system 1, when it receives the answer signal, stops the transmission of the tone data by the automobile switching center 22 (C12). Namely, the network system 1 stops transmitting the tone signal. Subsequently, the network system 1 transmits the above-described received answer signal to the calling mobile telephone MS1 (C13). The calling mobile telephone MS1 which has received this answer signal stops the RBT (C14), and starts conversation with the called mobile telephone MS2 (C15).

As described above, according to this embodiment 4, since tone data can be generated or changed in the mobile telephone MS, it is possible to generate an original RBT data and busy tone suited to the user's preference. In addition, since the tone data required to generate the above-described RBT and the like are registered in the network system 1, the tone data can be collectively managed in the network system 1. Further, since the mobile telephone MS does not need to store tone data unlike in the above-described embodiments 1 and 2, the storage area of the mobile telephone MS can be release for another use.

Embodiment 5

Figure 14:
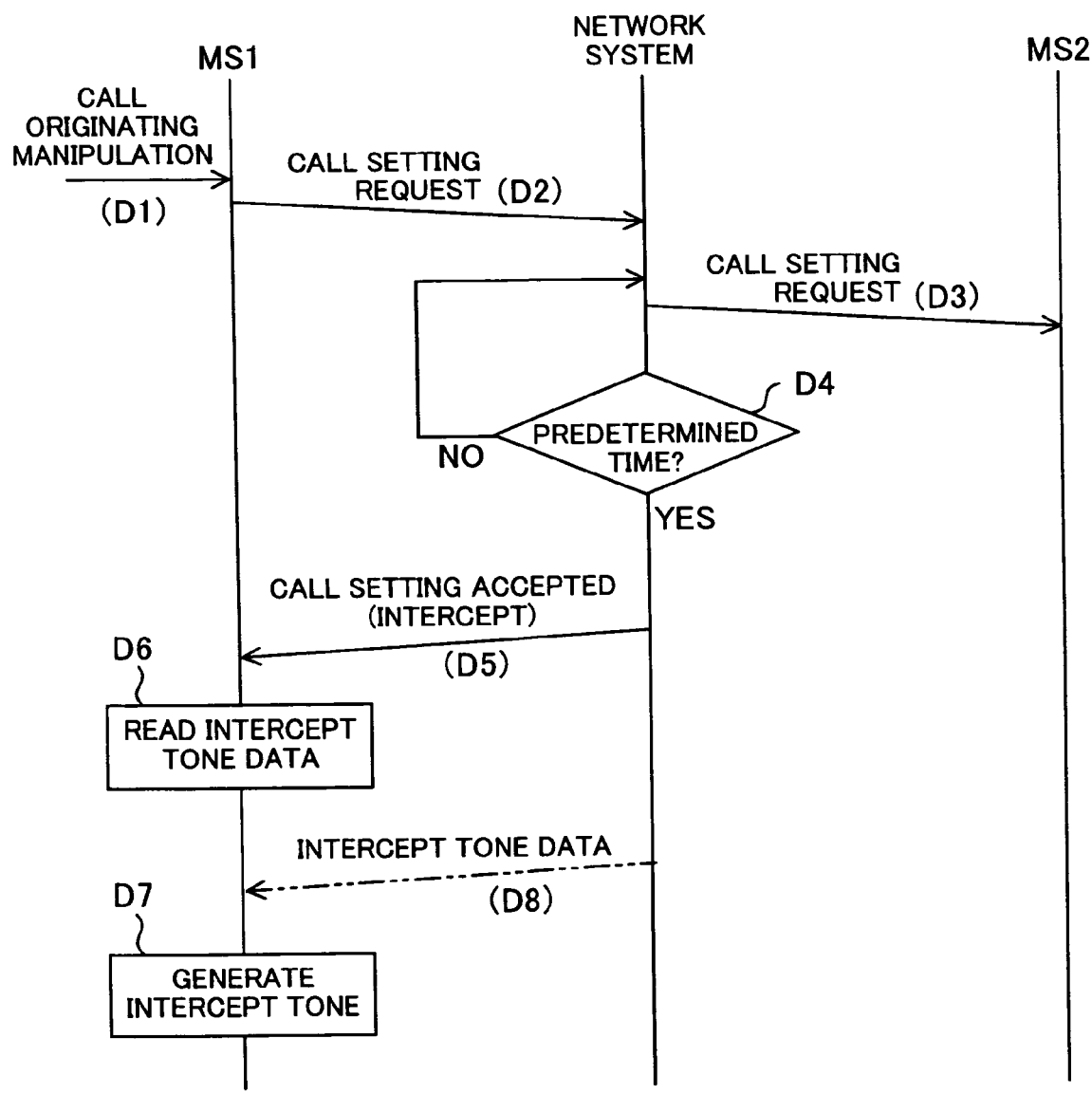
FIG. 14 is a sequence diagram for explaining call setting processing according to embodiment 5 of this invention.

FIG. 14 is a sequence diagram for explaining call setting processing according to embodiment 5 of this invention.

In the above-described embodiments 1 through 4, the "calling state" and the "busy state" are adopted as the operating states of the called mobile telephone MS2. In contrast, in this embodiment 5, in addition to the above-described two operating states, a power-off and existing-out-of-service-area state is adopted as one of the operating states of the called mobile telephone MS2.

More specifically, the embodiment in which this operating state is added is not applied to any embodiment in which operating state informing data is transmitted from the called mobile telephone MS2 like in embodiment 1. In the case where the called mobile telephone MS2 is in a power-off state and exists out of a service area, the called mobile telephone MS2 is incapable of transmitting operating state informing data.

A sound to be generated in the calling mobile telephone MS1 in the case where the called mobile telephone MS2 is in a power-off state and exists out of a service area is called intercept tone. A representative example of the intercept tone is the voice "the telephone you calls is turned off or is in a place radio waves do not reach". Namely, the intercept tone is generated during the state in which reception of data is impossible. The data of this intercept tone is registered as tone data together with RBT data and busy tone data. A registration place is the second memory part 14 in the calling mobile telephone MS1 or the tone data storage device 23 of the network system 1.

In the case where a call originating manipulation is performed on the calling mobile telephone MS1 (D1), the calling mobile telephone MS1 wirelessly transmits a call setting request signal to the network system 1 (D2). The network system 1 transmits this call setting request signal to the called mobile telephone MS2 (D3). However, in the case where the power of the called mobile telephone MS2 is off, and in the case where the called mobile telephone MS2 exists out of a service area, a call setting accepted signal is not returned to the network system 1 from the called mobile telephone MS2.

Then, the network system 1 repeatedly transmits the call setting accepted signal to the called mobile telephone MS2 (D3), and determines whether the network system 1 has received a call setting accepted signal within a predetermined time (D4). In the case where the network system 1 has not received a call setting accepted signal within the predetermined time, the power of the called mobile telephone MS2 can be regarded as being off, or the called mobile telephone MS2 can be regarded as existing out of the service area, so that the network system 1 transmits call setting accepted data indicative of an intercept state to the calling mobile telephone MS1.

In the following description, reference will be made to the case where tone data are registered in the calling mobile telephone MS1 and to the case where tone data are registered in the network system 1. First, in the case where tone data are registered in the calling mobile telephone MS1, the network system 1 transmits only the above-described call setting accepted data to the calling mobile telephone MS1 (D5) The calling mobile telephone MS1, when it receives the above-described call setting accepted data, reads intercept tone data corresponding to the above-described call setting accepted data from among the tone data registered in the second memory part 14 (D6), and generates an intercept tone corresponding to the intercept tone data from the speaker 15b (D7).

On the other hand, in the case where tone data is registered in the network system 1, the network system 1 transmits both of the above-described call setting accepted data and tone data to the calling mobile telephone MS1 (D5, D8). Specifically, the automobile switching center 22 of the network system 1 accesses the tone data storage device 23, and reads intercept tone data from among the registered tone data associated with the calling mobile telephone MS1 or the called mobile telephone MS2. Then, the automobile switching center 22 transmits this read intercept tone data to the calling mobile telephone MS1 as tone data. The calling mobile telephone MS1, when it receives the above-described call setting accepted data and intercept tone data, generates a sound corresponding to the received intercept tone data from the speaker 15b (D7).

As described above, according to this embodiment 5, in addition to the "calling state" and the "busy state", the "power-off and existing-out-of-service-area state" is adopted as one of the operating states of the called mobile telephone. Accordingly, it is possible to improve service for the user to a further extent.

Embodiment 6

Figure 15:
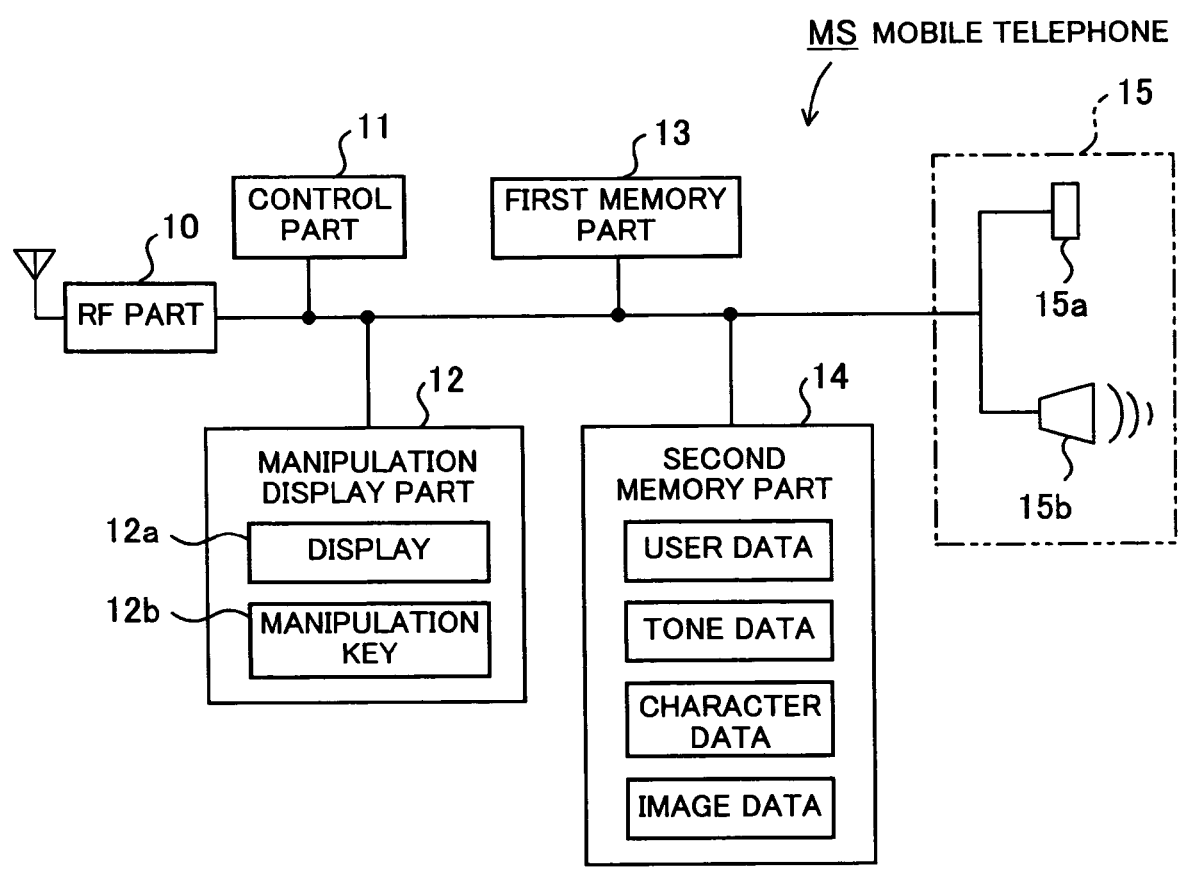
FIG. 15 is a block diagram showing the internal construction of the mobile telephone according to embodiment 6 of this invention.

FIG. 15 is a block diagram showing the internal construction of the mobile telephone MS according to embodiment 6 of this invention. In FIG. 15, the same reference numerals are used to denote the same functional parts as those shown in FIG. 3.

In the above-described embodiments 1 through 5, tone data has been described as the operating state informing data by way of example. In contrast, in this embodiment 6, in addition to tone data, character data and image data are adopted as the operating state informing data. The term "image" represents a concept including still images and moving images.

More specifically, in addition to user data, tone data and character data as well as image data are stored in the second memory part 14 of the mobile telephone MS. Each of the character data and the image data is data indicative of a calling state, a busy state or a data-reception-impossible state. Namely, character data indicative of a calling state, character data indicative of a busy state, and character data indicative of a data-reception-impossible state are stored in the second memory part 14. Further, image data indicative of a calling state, image data indicative of a busy state, and image data indicative of a data-reception-impossible state are registered in the second memory part 14.

When the character data and/or the image data are to be read from the second memory part 14, the character data and/or the image data are read together with tone data corresponding to the same operating state. For example, in the case where the called mobile telephone MS2 is in a communication-possible state, RBT data and the character data and/the image data indicative of a calling state are read from the second memory part 14. In the case where the called mobile telephone MS2 is in a communication-impossible state, busy tone data and the character data and/the image data indicative of an idle state are read from the second memory part 14. Further, in the case where the power of the called mobile telephone MS2 is turned off or the called mobile telephone MS2 exists out of a service area, intercept tone data and the character data and/or the image data are read from the second memory part 14. Accordingly, the calling mobile telephone MS1 outputs an RBT, a busy tone or an intercept tone from the speaker 15b, and also displays on the display 12a a character or an image corresponding to the operating state of the called mobile telephone MS2.

As described above, according to this embodiment 5, the user of the calling mobile telephone MS1 is formed of the operating state of the called mobile telephone MS2 by using not only tones such as an RBT, a busy tone and an intercept tone but also a character and/or an image. Accordingly, the user's originality can be made far higher, and since the operating state can be represented by sound and visual information, informing performance can also be made far higher.

ANOTHER EMBODIMENT

The embodiments of this invention are as described above, but this invention is not limited to any of the above-described embodiments. By way of example, the aforementioned embodiments have been described with reference to the case where a mobile telephone is adopted as a wireless telephone unit. However, for example, a mobile information terminal having a conversation function can also be adopted as the wireless telephone unit.

The invention claimed is:

1. A wireless telephone comprising:
    a transmitter for wirelessly transmitting call setting request data in response to a predetermined call originating manipulation;
    a receiver for receiving operating state informing data indicative of an operating state of a called telephone after the call setting request data has been transmitted, which data is registered in the called telephone, wherein the operating state informing data indicates one of a calling state, busy state, or data-reception-impossible state prior to connection to the called telephone; and operating state informing portion for informing the operating state of the called telephone based on the operating state informing data received by the receiver.

2. A wireless telephone according to claim 1, wherein the call originating manipulation is a key manipulation which indicates call origination.

3. A wireless telephone according to claim 1, wherein the operating state informing data is ring back tone data indicative of a calling state, busy tone data indicative of a busy state, or intercept tone data indicative of a data-reception-impossible state, the operating state informing portion generating a ring back tone, a busy tone, or an intercept tone.

4. A wireless telephone according to claim 1, wherein the operating state informing data is character data or image data indicative of a calling state, a busy state, or a data-reception-impossible state, the operating state informing portion displaying on a screen a character corresponding to the character data or an image corresponding to the image data.

5. A wireless telephone according to claim 1, wherein the operating state informing data is ringing tone data associated with the operating state.

6. A wireless telephone comprising:
a receiver for receiving call setting request data from a calling telephone;
a register in which operating state informing data indicative of operating states are previously registered;
a data reader for, in a case in which the call setting request data is received by the receiving portion, reading operating state informing data corresponding to an operating state of the wireless telephone when the receiver receives the call setting request data from among the operating state informing data registered in the register; and
a transmitter for wirelessly transmitting the read operating state informing data to the calling telephone, wherein the operating state informing data indicates one of a calling state, busy state, or data-reception-impossible state prior to connection to the calling telephone.

7. A wireless telephone according to claim 6, further comprising a data inputting portion for inputting the operating state informing data, and a registration controller for registering in the register the operating state informing data input by the data inputting portion.

8. A wireless telephone according to claim 6, wherein the operating state informing data is ring back tone data indicative of a calling state, busy tone data indicative of a busy state, or intercept tone data indicative of a data-reception-impossible state.

9. A wireless telephone according to claim 6, wherein the operating state informing data are character data or image data indicative of a calling state, a busy state, or a data-reception-impossible state.

10. A wireless telephone according to claim 6, wherein the operating state informing data is ringing tone data associated with the operating state.

11. A wireless telephone comprising:
a receiver for receiving, at a calling telephone, call setting accepted data after a call has been originated;
a register in which operating state informing data indicative of operating states are previously registered;
a data reader for, in a case in which the call setting accepted data is received by the receiver, reading operating state informing data corresponding to the received call setting accepted data from among the operating state informing data registered in the register, based on the received call setting accepted data; and
an operating state informing portion for informing an operating state corresponding to the operating state informing data read by the data reader, wherein the operating state informing data indicates one of a calling state, busy state, or data-reception-impossible state of another wireless telephone prior to a connection.

12. A wireless telephone according to claim 11, wherein the operating state informing data is ring back tone data indicative of a calling state, busy tone data indicative of a busy state, or intercept tone data indicative of a data-reception-impossible state, the operating state informing portion generating a ring back tone, a busy tone, or an intercept tone.

13. A wireless telephone according to claim 11, wherein the operating state informing data is character data or image data indicative of calling state, a busy state, or a data reception-impossible state, the operating state informing portion displaying on a screen a character corresponding to the character data or an image corresponding to the image data.

14. A wireless telephone according to claim 11, wherein the operating state informing data is ringing tone data associated with the operating state.

15. A wireless telephone system provided with a wireless telephone which wirelessly communicates with a network system, wherein:
the wireless telephone includes an inputting portion for inputting operating state informing data indicative of an operating state, a transmitter for wirelessly transmitting the input operating state informing data to the network system, and a transmitter for wirelessly transmitting call setting accepted data corresponding to the operating state to the network system in response to an incoming call from a calling wireless telephone;
the network system includes a receiver for receiving the operating state informing data transmitted from the wireless telephone, a register for registering the received operating state informing data in a manner to associate the received operating state informing data with the transmitting wireless telephone, a data reader for, in a case in which the call setting accepted data is received from the wireless telephone, reading operating state informing data associated with the calling or called wireless telephone from among the operating state informing data registered in the register, based on the received call setting accepted data, and a transmitter for wirelessly transmitting the operating state informing data to the calling wireless telephone; and
the wireless telephone further includes a receiver for receiving the operating state informing data from the network system and an operating state informing portion for informing an operating state corresponding to the received operating state informing data.

16. A wireless telephone system according to claim 15, wherein the operating state informing data is ring back tone data indicative of a calling state, busy tone data indicative of a busy state, or intercept tone data indicative of a data-reception-impossible state, the operating state informing portion generating a ring back tone, a busy tone, or an intercept tone.

17. A wireless telephone system according to claim 15, wherein the operating state informing data is character data or image data indicative of a calling state, a busy state, or a data-reception-impossible state, the operating state informing portion displaying on a screen a character corresponding to the character data or an image corresponding to the image data.

18. A wireless telephone, comprising:
- means for receiving call setting request data based on a call originating manipulation at a calling telephone;
- means for registering operating state informing data indicative of at least one operating state of a called telephone based on the call setting request data;
- means for reading operating state informing data corresponding to the at least one operating state when the call setting request data is received by the means for receiving; and
- means for transmitting call setting accepted data corresponding to an operating state when the call setting request data is received, wherein the operating state informing data is read by the means for reading and the transmitting of the operating state informing data corresponding to an incoming response is stopped.

19. A wireless telephone according to claim 18, further comprising:
- means for inputting the operating state informing data; and
- registration control means for registering the operating state informing data input by the means for inputting by transmitting the operating state informing data to a network system.

20. A wireless telephone according to claim 18, wherein:
the operating state informing data is at least one of a ring back tone data indicative of a calling state, busy tone data indicative of a busy state and intercept tone data indicative of a data-reception-impossible state.

21. A wireless telephone according to claim 18, wherein:
the operating state informing data includes at least one of character data and image data indicative of at least one of a calling state, a busy state and a data-reception-impossible state.

* * * * *